(12) United States Patent
Sinthusai et al.

(10) Patent No.: US 9,617,357 B2
(45) Date of Patent: Apr. 11, 2017

(54) CATALYST FOR OLEFIN POLYMERIZATION AND A METHOD FOR THE PREPARATION THEREOF

(75) Inventors: Likhasit Sinthusai, Rayong (TH); Roman Strauss, Rayong (TH); Siriporn Thumsuruk, Amphor Muang (TH); Awiruth Itsariya-Anan, Amphor Muang (TH)

(73) Assignee: IRPC PUBLIC COMPANY LIMITED., Rayong (TH)

( * ) Notice: Subject to any disclaimer, the term of this patent is extended or adjusted under 35 U.S.C. 154(b) by 0 days.

(21) Appl. No.: 14/412,427

(22) PCT Filed: Jul. 2, 2012

(86) PCT No.: PCT/TH2012/000023
§ 371 (c)(1),
(2), (4) Date: Mar. 18, 2015

(87) PCT Pub. No.: WO2014/007765
PCT Pub. Date: Jan. 9, 2014

(65) Prior Publication Data
US 2015/0203605 A1  Jul. 23, 2015

(51) Int. Cl.
*C08F 10/02* (2006.01)
*C08F 10/00* (2006.01)
*C08F 110/02* (2006.01)

(52) U.S. Cl.
CPC .............. *C08F 10/02* (2013.01); *C08F 10/00* (2013.01); *C08F 110/02* (2013.01)

(58) Field of Classification Search
None
See application file for complete search history.

(56) References Cited

U.S. PATENT DOCUMENTS

| 7,432,220 B2 | 10/2008 | Garoff et al. |
| 2004/0063572 A1 | 4/2004 | Kim et al. |
| 2006/0111523 A1 | 5/2006 | Garoff et al. |
| 2011/0086992 A1 | 4/2011 | Miranda et al. |
| 2011/0160043 A1 | 6/2011 | Miranda et al. |

FOREIGN PATENT DOCUMENTS

| TH | WO 2012091684 A1 * | 7/2012 | ............ C08F 110/02 |
| WO | 01/85803 A2 | 11/2001 | |
| WO | 03/000745 A1 | 1/2003 | |
| WO | 2006/103172 A1 | 10/2006 | |

* cited by examiner

*Primary Examiner* — Catherine S Branch
(74) *Attorney, Agent, or Firm* — Novick, Kim & Lee, PLLC; Jae Youn Kim

(57) ABSTRACT

In accordance with the present disclosure, a method of preparing a solid support for a transition metal catalyst is disclosed. The solid support may have a unique morphology that may be derived from contacting the magnesium compound and an electron donor in the presence of a fluorinated organic compound to form the solid support. The solid support may be used to form an enhanced catalyst. The enhanced catalyst may be used, in combination with an organoaluminum compound, as a Ziegler-Natta (ZN) catalyst. The ZN catalyst including the enhanced catalyst may be used to form a UHMWPE.

19 Claims, 8 Drawing Sheets

CATALYST FOR OLEFIN POLYMERIZATION AND A METHOD FOR THE PREPARATION THEREOF

TECHNICAL FIELD

The present disclosure relates generally to a catalyst or catalyst system for polymerizing olefins particularly for Ultra High Molecular Weight Polyethylene (UHMWPE), and a process for preparing, producing, or manufacturing the catalyst or catalyst system. More particularly, the disclosure relates to a process for preparing, producing, or manufacturing a catalyst or catalyst system with enhanced morphological properties and/or enhanced catalytic profiles.

BACKGROUND

UHMWPE, also known as high modulus PE or high performance PE, refers to linear polyethylene (PE) having a viscometrically measured average molecular weight of at least $1\times10^6$ g/mol. Due to its ultra high molecular weight (usually about 2 to 6 million atomic units), UHMWPE has excellent impact resistance, abrasion resistance, sliding properties, and chemical resistance. UHMWPE is widely employed in mechanical fields for example it is used in bearings, pulleys, and as a lining for trucks or dock guards. In the medical field, UHMWPE plays a prominent role as the only material that meets the requirements for tibia-inlays in modern knee implants. Use of this material, however, is more taxing than standard polymers. The ultra-high molecular weight of UHMWPE makes the product difficult to palletize. Thus, bulk density, particle size, and particle size distribution of UHMWPE are essential to the processability and use of this polymer which must be delivered in powder form, rather than the typical pellets of most polymers.

During UHMWPE manufacture, ethylene monomers are polymerized in the presence of a homogeneous (metallocene) or heterogeneous catalyst. Heterogeneous Ziegler-Natta (ZN) catalysts are commonly used in commercial scale production while homogeneous catalysts are used in rare cases where specific properties, such as a very narrow molecular weight distribution, are required. Heterogeneous ZN catalysts are comprised of the reaction product of a transition metal halide and an organometallic compound. Immobilization of the ZN catalyst on an oxide or halide compound increases catalytic activity and improves morphology.

Heterogeneous systems, however, have several drawbacks. Significantly, the surface of a heterogeneous catalyst particle may have multiple active sites each site having a different level of activity and selectivity towards monomer insertion. Multiple active sites on catalyst particles may result in uncontrolled morphology, reactor fouling, and inconsistent particle size (e.g., a large span value) and density. One potential cause of multiple active sites on a catalyst particle may be the way in which the transition metal halide binds to the support. Formation of the support dramatically affects the manner in which the transition metal halide molecule binds to form the final catalyst. Therefore control of support formation is essential to catalyst formation. Poor support formation leads to poor control over polymer structure.

There are various methods for preparing ZN catalysts in order to improve the properties and/or characteristics of these catalysts and subsequently improve the resulting polymer. More specifically, experiments and studies have been performed in relation to processes and methods for preparing specific catalysts with the aim of improving the properties and/or characteristics said catalysts.

United Stated Patent 2004/0063572 A1 discloses a method of forming a titanium solid catalyst impregnated on a particulate transitional metal compound and supported on inert solid particularly magnesium chloride. The method includes: (1) preparing magnesium compound solution; (2) reacting said compound solution with transitional metal compound or mixture thereof to produce a support; and (3) reacting said support with titanium compound and electron donor to produce solid complex titanium catalyst. However, the resulting catalyst has a large particle size and a fairly low bulk density, making this catalyst less beneficial for use with UHMWPE.

The method of U.S. patent application Ser. No. 13/041,028 uses a metallocene catalyst to form UHMWPE. U.S. patent application Ser. No. 12/971,843 forms a supported metallocene catalyst for preparation of HMW or UHMWPE. Metallocene catalysts have a single catalytic site and produce a polymer with a narrow molar mass composition and tacticity distribution. However, metallocene catalysts are very costly and the high aluminum to transition-metal ratio required to achieve catalytic activity make use of metallocenes prohibitive.

The catalyst of United States Patent 2006/0111523 is formed by an emulsion technique. This method forms the emulsion by dispersing the magnesium compound in a continuous phase of immiscible media. The resulting catalyst demonstrates controlled morphology. However, this method requires over 11 hours to complete and multiple additions and extractions making it costly and time consuming.

Various limitations, drawbacks, and/or disadvantages are associated with existing methods and processes for preparing catalysts for polymerizing olefins (i.e., preparing polyolefins). For example, lack of specific control of support formation in the foregoing methods may result in large or non-uniform catalyst particles. Non-uniform catalysts may result in polymers lacking uniformity in shape and size, having a broad size distribution. Formation of the support, the catalyst particle, and the UHMWPE may be time consuming, and/or costly. Therefore, there is a demand for more cost efficient and/or simpler methods and processes for preparing catalysts with improved morphological properties and/or enhanced catalytic activities.

SUMMARY

In accordance with a first aspect of the present disclosure, there is a process for preparing an enhanced catalyst for use in polymerization of an olefin including: contacting a solid support with a titanium compound in the presence of a silicon halide; precipitating an enhanced catalyst for use in polymerization of an olefin; wherein the solid support comprises a (magnesium chloride)•(electron donor) compound prepared by forming a magnesium complex solution; chlorinating the magnesium complex solution with a chlorinating agent in the presence of an internal electron donor and a fluorinated organic compound to form a chlorinated magnesium complex solution compound and recrystallizing the solid (magnesium chloride)•(electron donor) support.

In accordance with a second aspect of the present disclosure, there is a process for preparing a solid support for a catalyst for polymerizing olefins including forming a magnesium complex solution; chlorinating the magnesium complex solution with a chlorinating agent in the presence of an internal electron donor and a fluorinated organic compound to form a chlorinated magnesium complex solution; and recrystallizing the chlorinated magnesium complex solution to form a solid (magnesium chloride)•(electron donor) support.

In accordance with a third aspect of the present disclosure, there is A method for preparing an ultra high molecular weight polyethylene including: polymerizing ethylene monomers under pressure in the presence of an organoaluminum compound and an enhanced catalyst comprising a solid support and a titanium compound, wherein the solid support is prepared by forming a magnesium complex solution; chlorinating the magnesium complex solution with a chlorinating agent in the presence of an internal electron donor and a fluorinated organic compound to form a chlorinated magnesium complex solution; and recrystallizing the chlorinated magnesium complex solution to form a solid (magnesium chloride)•(electron donor) support.

BRIEF DESCRIPTION OF THE DRAWINGS

Embodiments of the present disclosure are described hereinafter with reference to the following figures, in which.

DETAILED DESCRIPTION

The present disclosure includes methods for preparing a solid support for a catalyst, an enhanced catalyst, and an UHMWPE. Both the solid support and the enhanced catalyst have improved activity, and a narrow distribution of particle size (small span value), which may be obtained by controlling solubility and recrystallization of the reactants in the preparation processes. Polymers prepared using these enhanced catalysts may have more desirable properties such as, high bulk density and narrow particle size distribution. Methods of olefin polymerization using the enhanced catalyst are also provided according to particular embodiments. More particularly, the following description of this enhanced catalyst is provided in association with the polymerisation of ethylene to thereby produce UHMWPE.

It will be understood that the details presented herein are used for describing embodiments of the present disclosure, and are not intended to limit the scope of the present disclosure. Unless defined otherwise, all technical and scientific terms used herein have the same meaning as commonly understood by one of ordinary skill in the relevant art.

Representative aspects of methods, processes, and/or techniques for preparing, producing, and/or manufacturing polyolefin catalysts, catalyst systems, or catalyst components or compositions, representative aspects of catalysts, catalyst systems, or catalyst components or compositions for polymerizing olefins (e.g., ethylene), as well as representative aspects of methods and processes for polymerizing olefins (e.g., ethylene) using said catalysts, are described in detail hereinafter with reference to FIGS. 1 to 9. The embodiments provided by the present disclosure are not precluded from applications in which particular fundamental functional, technical, structural, and/or operational principles disclosed herein are employed.

Formation of a Solid Support for a Transition Metal Catalyst

According to embodiments of the process of this disclosure, a solid support for a transition metal catalyst is prepared. Solid support preparation can include several reaction steps, such as: (1) forming a magnesium complex solution; (2) chlorinating the magnesium complex solution with a chlorinating agent in the presence of an internal electron donor compound and a fluorinated organic compound; and, (3) recrystallizing the chlorinated magnesium complex solution to form a solid magnesium chloride or magnesium chloride based support, which, in the context of the present disclosure includes, is, corresponds to a (magnesium chloride)•(electron donor) support. Formation of the enhanced catalyst can further include: (4) contacting the solid support with a titanium compound to produce an enhanced catalyst. It should be noted that this solid support can be used in the formation of catalysts (e.g., metallocene catalysts) by the same and other methods, than the enhanced catalysts disclosed in the present disclosure.

Figure 1:
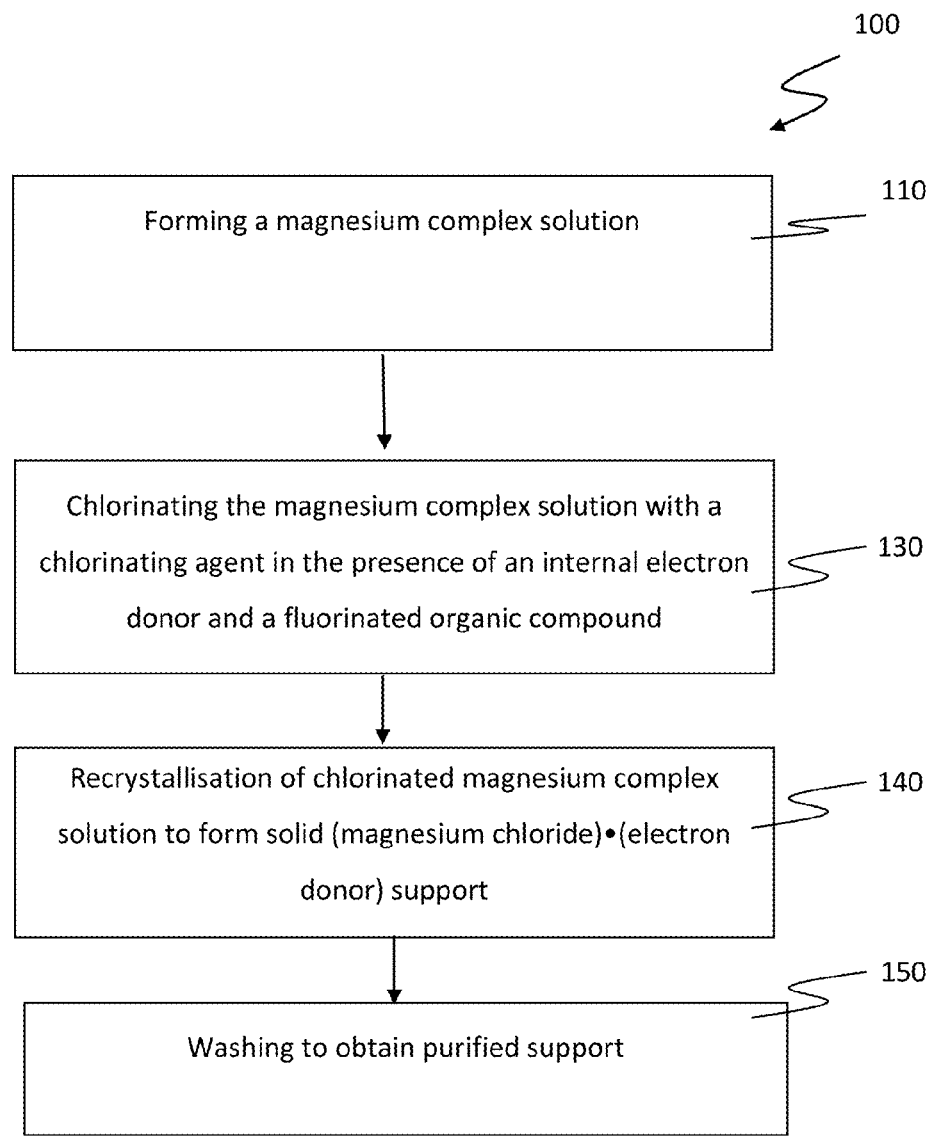
FIG. 1 shows a flowchart of a process 100 for preparing or producing a solid support according to an embodiment of the present disclosure.

FIG. 1 shows a flowchart of a process 100 for preparing or producing a support according to an embodiment of the present disclosure.

As stated above, the support of the present disclosure can be prepared by forming a solution containing 110 a known quantity (e.g., known weight or concentration) of a magnesium compound. In embodiments, the magnesium compound can include, for example, a halogenated magnesium, a pseudo-halogenated magnesium, an alcoholate magnesium, an alkyl magnesium, and the like, and combinations of these. Examples of halogenated magnesiums include, but are not limited to: magnesium dichloride; magnesium bromide; magnesium hydroxyl chloride; and the like, and combinations of these. Examples of pseudo-halogenated magnesiums include, for example, chloroethoxymagnesium, ethylmagnesium bromide, and the like, and combinations of these. Examples of alcholate magnesiums include, for example, magnesium ethoxide, magnesium methoxide, magnesium propoxide, and the like, and combinations of these. Examples of alkyl magnesiums include, for example, alkyl magnesium bromide, alkyl magnesium chloride, and the like, and combinations of these.

In embodiments, solubilization of the magnesium compound can occur in the presence of a group 13 metal halide. The group 13 metal can be generally selected from, for example, boron, aluminum and combinations of these. The halide of the group 13 metal halide may be, for example, chlorine, fluorine, bromine, iodine, or combinations thereof. Some suitable group 13 metal halides include, but are not limited to, boron trifluoride, boron trichloride, boron tribromide, aluminum trifluoride, aluminum tribromide, aluminum trichloride, aluminum triiodide, and combinations of these. In embodiments, the group 13 metal halide is aluminum trichloride.

In embodiments where both a magnesium compound and group 13 metal halide are used, any suitable molar ratio of the group 13 metal halide to magnesium compound and may be employed over a relatively broad range. Generally, the molar ratio is in the range of about 0.1:1 to about 1:1. When magnesium dichloride and aluminum trichloride are employed, the molar ratio of Al to Mg is about 0.3:1.

The magnesium compound, alone or with a group 13 metal halide, can form a magnesium complex solution in a solvent. The solvent can include one or more components, such as, for example, an alcohol, an ether, a phosphorus compound, a hydrocarbon compound, a silicon compound, and the like.

The alcohol of the solvent can be, for example, a $C_{1-3}$ alcohol having relative low molecular weight or a $C_{4-20}$ alcohol having relative high molecular weight. Examples of a $C_{1-3}$ alcohol include: methanol, ethanol, and propanol. Examples of a $C_{4-20}$ alcohol include, for example: butanol, pentanol, hexanol, octanol, decanol, steryl alcohol, benzyl alcohol, pentaethylalcohol, isopropylbenzyalcohol, and cumylalcohol. In embodiments, the solvent is a $C_{4-20}$ alcohol such as butanol, isoamly alcohol, 2-ethyl 1-hexanol, or combinations of these. In some embodiments, a high crystalline anhydrous $MgCl_2$ is dissolved in a relatively height molecular weight alcohol. In embodiments, the alcohol having a relatively high molecular weight is 2-ethyl-1-hexanol. The molar ratio between the alcohol and the magnesium compound can range between approximately 2:1 and approximately 10:1. In selected embodiments, the molar ratio of alcohol to magnesium compound can be approximately 3.5:1.

One or more ethers can also be added into the solvent. Without being bound by any theory, it is believed that the either may increase the solubility of the magnesium compound. In some embodiments of the present invention, the ether can be, for example, a $C_{2-15}$ cyclic ether such as tetrahydrofuran, tetrahydropyran, or combinations of these. The molar ratio between the ether and the magnesium compound can range from about 0.1:1 to about 1:1. In embodiments, the molar ratio of ether to magnesium compound is maintained at about 0.4:1.

A phosphorous compound can be added to the solvent. The phosphorous compound can be selected from tributyl phosphate, trichlorophosphine, tribromophosphine, diehychlorophosphite, diphenylchlorophosphite, diethybromophosphite, diphenylbromophosphite, methydichlrophosphite, phenyldichlorophoaphite, trimethylphosphite, hexyldichloroposphite, triethyphosphite, trinomalbutylphosphite, trioctylphosphite, tridecylphosphite, triphenylphosphite, phosphorus oxychloride, tributyl phosphate, triethylphosphate, trinomalbutylphosphate, triphenylphosphate, and the like, and combinations thereof. The molar ratio between the phosphorus compound and magnesium compound can range from about 0.2:1 to about 2.5:1. In embodiments, the molar ratio of phosphorous compound to magnesium compound is maintained at about 0.7:1. Without being bound to a specific theory, it is believed by the inventors that, in some embodiments, the phosphorus compound can assist (e.g., increase) the solubility of the magnesium compound.

A hydrocarbon can also be added to the solvent mixture. In representative embodiment, the hydrocarbon can be selected from, for example, aliphatic hydrocarbons, alicyclic hydrocarbons, aromatic hydrocarbons, halogenated hydrocarbons, and the like, and combinations thereof. Aliphatic hydrocarbons include, for example, pentane, hexane, heptanes, octane, decane, and kerosene. Alicyclic hydrocarbons include, for example, cyclopentane, methyl cyclopentane, cyclohexane, and methyclyclohexane. Aromatic hydrocarbons include, for example, benzene, toluene, xylene, and ethylbenzene. Halogenated hydrocarbons include, for example, trichloroethylene, carbontetrachloride, and chlorobenzene. The amount of hydrocarbon in the solvent does not depend upon the amount of magnesium compound. Rather, any amount of hydrocarbon can be included in the solvent such that the amount is sufficient to maintain stirability of the magnesium compound in the solvent. The amount of hydrocarbon in the solvent, however, can be used to determine the amount of fluorinated organic compound to add in subsequent steps. Without being bound by a specific theory or embodiment, it is believed by the inventors that, in some embodiments, the hydrocarbon may facilitate or effectuate dissolution or dispersion of the magnesium compound.

Additionally, the solvent of the magnesium complex solution can include a silicon compound. The silicon compound can be, for example, an organosilane such as, for example, trimethychlorosilane, trimethyethoxisilane, dimethychlorosilane, tetraehoxysilane, tetrabutoxysilane and the like, and combinations thereof. The molar ratio between the silicon compound and the magnesium compound can be between about 0.05:1 and about 0.5:1. In embodiments, the molar ratio of the silicon compound to magnesium compound is about 0.14:1.

As stated above, the solvent used in forming the magnesium complex solution can include a group 13 metal halide, an alcohol, a cyclic ether, a phosphorus compound, a hydrocarbon, and/or a silicon compound. The formation of a magnesium complex solution from the magnesium compound can be achieved by dissolving the magnesium compound in the solvent. The magnesium compound/solvent mixture ("the mixture") can be heated in order to dissolve the magnesium compound. The mixture can be heated to, for example, from about 100° C. to 120° C. In embodiments, the mixture can be heated to about 110° C. The mixture can be heated until the magnesium compound is dissolved, for example, the magnesium compound can take from about 3 hours to about 5 hours to dissolve. In embodiments, the mixture can be heated for about 4 hours to dissolve the magnesium compound. The magnesium compound can dissolve in the solvent forming a magnesium complex solution.

A solid support can then be formed from the magnesium complex solution. In order to form the solid support the magnesium complex solution can be chlorinated. Chlorination of the magnesium complex solution can be achieved at a temperature of less than approximately 10° C., for example between approximately 0° C. and about 5° C. Cooling of the magnesium complex solution for chlorination can take place over any sufficient amount of time wherein the magnesium compound remains in solution during cooling. Typically cooling occurs over approximately 1 hour. Alternative time durations, for example between approximately 0.5 hours and approximately 1.5 hours, as well as alternative temperatures, for example between approximately −5° C. and 0° C., can also be used.

Chlorination of the magnesium complex solution can require a chlorinating agent. A chlorinating agent can be, for example, a transition metal chloride. The metal of the transition metal chloride can include for example, titanium, zirconium, vanadium, and combinations of any two or more thereof. In embodiments, titanium tetrachloride can be used. The molar ratio of transition metal chloride to magnesium compound of the magnesium complex solution can range between about 1:1 to about 10:1. In embodiments, the molar ratio of transition metal chloride to magnesium compound can be about 2:1.

Chlorination of the magnesium complex solution can occur in the presence of an electron donor and a fluorinated organic compound. In accordance with the present disclosure, "internal electron donor" means that the electron donor is part of the catalyst as opposed to an "external electron donor", which can be added to a polymerization reaction. In certain embodiments, the internal electron donor can be selected from, for example, monoesters, diesters, succinates, or diethers. In embodiments, the internal electron donor can be ethyl benzoate (EB). The molar ratio of internal electron donor to magnesium compound can range between about 0.05:1 to about 0.5:1. In embodiments, the molar ratio of internal electron donor to magnesium compound can be about 0.2:1.

As stated above, chlorination of the magnesium complex solution can occur in the presence of a fluorinated organic compound. Fluorinated organic compounds that can be used include, for example, include semi-, highly-, or per-fluorinated hydrocarbons, and functionalized derivatives thereof. In embodiments, the fluorinated organic compound can be a $C_4$-$C_{10}$ fluorinated hydrocarbon. Specific examples of fluorinated organic compounds include, for example, perfluoroalkanes and perfluorocycloalkanes such as perfluorohexane, perfluoroheptane, perfluorooctane and perfluoromethyclyclohexane. The volume to volume ratio of fluorinated organic compound to hydrocarbon can range from about 1:100 to about 1:1. In some embodiments, the volume of fluorinated organic compound added to the magnesium complex solution is less than or equal to the total volume of magnesium complex solution, chlorinating agent, and internal electron donor combined. In embodiments, the volume of fluorinated organic compound added is less than 20% of the total volume of the magnesium complex solution, chlorinating agent, and internal electron donor combined.

Recrystallization 140 of the chlorinated magnesium complex solution can occur via a singular step or via a controlled, incremental, progressive, and/or stepwise process. In embodiments, the recrystallized (solid-state) magnesium compound support structure can include magnesium compound complex and/or adduct of (magnesium compound ROH).

The controlled, incremental, progressive, and/or stepwise process resulting in recrystallization 140 can include between about 1 and 5 heating steps followed by 1 or more cooling steps, in embodiments two heating steps can be used followed by one cooling step. The incremental heating can proceed as follows, for example, heating from a cooled state, as noted above, to a first temperature for a first amount of time followed by heating to a second temperature for a second amount of time, etc. The first temperature can be, for example, about 25° C. to about 75° C. In embodiments, the first temperature is about 60° C. The first amount of time can be from about 15 min to about 1 hour. In embodiments, the first amount of time is about 30 min. The second temperature can be, for example, about 75° C. to about 115° C. In embodiments, the second temperature is about 100° C. The second amount of time can be from about 15 min to about 1 hour. In embodiments, the second amount of time is about 30 min. The cooling temperature can be, for example, about 60° C. to about 80° C. In embodiments, the cooled temperature is about 70° C. The first amount of time can be from about 15 min to about 1 hour. In embodiments, the first amount of time is about 30 min.

Crystals formed by recrystallization 140 of the reaction mixture can include the following compound: (magnesium chloride)•(electron donor). This compound can be called the solid support. The solid support can be purified by washing 150. In various embodiments, washing 150 can occur, for instance, using an aliphatic solvent, such as, hexane or heptane. The washing 150 can take place at a temperature, for example, between approximately 60° C. and 80° C. In embodiments, the washing temperature can be about 70° C. The solid support can be washed 150 any number of times. For example, the solid support can be washed 150 from about 2 to about 10 times. In embodiments, the solid support can be washed 150 three times. Other methods or techniques known in the art for purification of a solid support can also be used.

The resulting solid support exhibits a unique morphology, high surface area, and small particle size. The particle size and particle size span can be measured using, for example, laser light scattering technique. The particle size of the support can be, for example, from about 6.0 μm to about 7.5 μm. The average diameter of the support can be from about 5.5 μm to about 7.5 μm. The particle size span value of the support can be from about 0.9 to about 1.0.

Preparation of an Enhanced Catalyst

Figure 2:
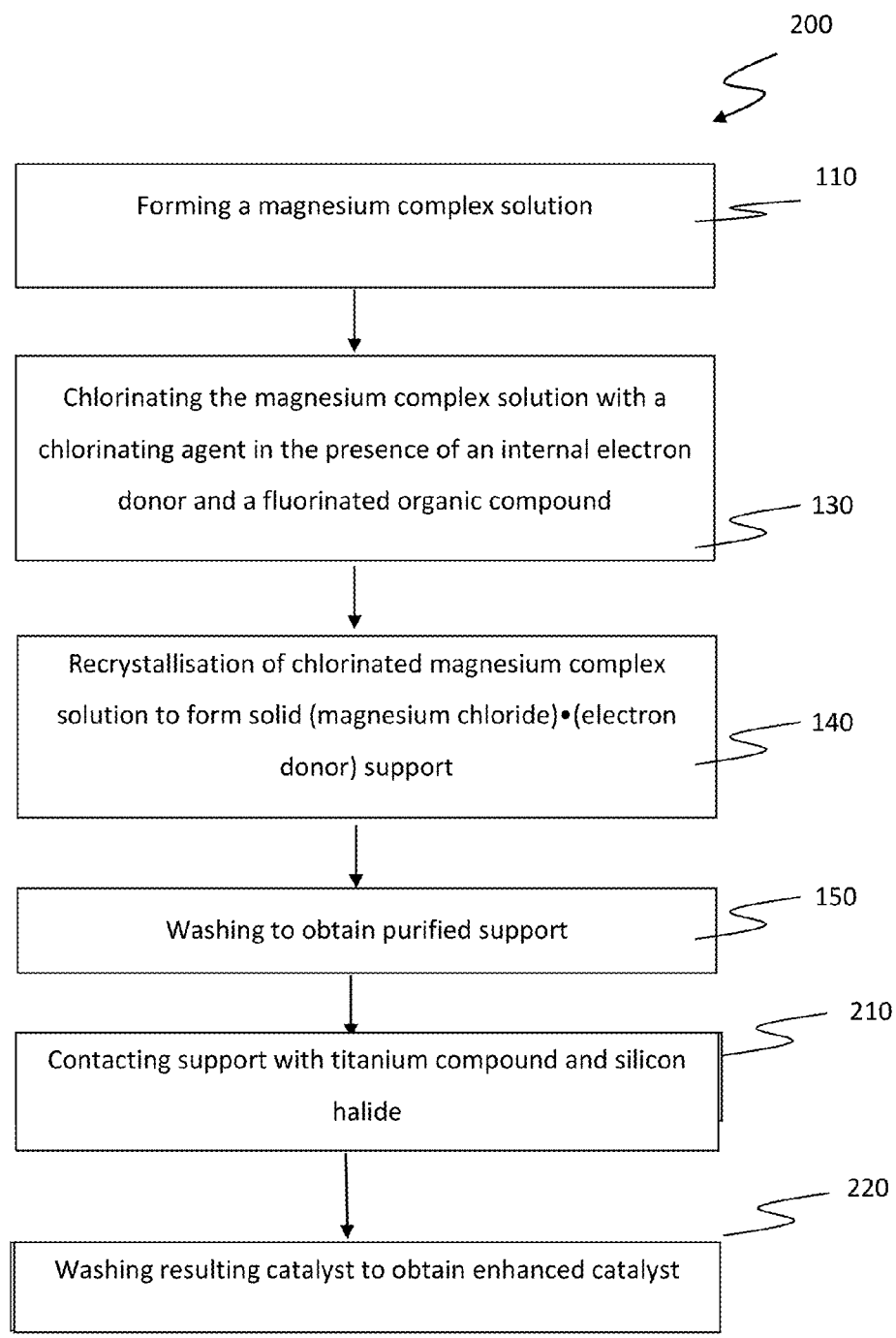
FIG. 2 shows a flowchart of a process 200 for preparing or producing an enhanced catalyst according to an embodiment of the present disclosure.

FIG. 2 shows a flowchart of a process 200 for preparing or producing an enhanced catalyst according to an embodiment of the present disclosure. In accordance with the present disclosure, an enhanced catalyst can be formed using the solid support. In embodiments, the solid support can be contacted 210 with a titanium compound and a silicon halide. The titanium compound can be, for example, titanium tetrachloride, titanium trichloride, and the like, and combinations of these. In some embodiments, a vanadium compound, such as vanadium oxide can be used in place of the titanium compound. In some embodiments, the titanium compound is titanium tetrachloride.

The silicon halide can be, for example, halogenated with one or more halides. For example, the silicon halide can be, silicon tetrachloride, trichlorosilane, silicon tetra fluoride, silicon tetra bromide, silicon tetraiodide, silicon tribromochloride, dibromo(dichloro)silane, bromo(trichloro)silane, chloro(triiodo)silane, dichloro(diiodo)silane, trichloro(iodo)silane, tribromo(iodo)silane, dibromo(diiodo)silane, bromo(triiodo)silane, tribromo(fluoro)silane, trichloro(fluoro)silane, dibromo(difluoro)silane, dichloro(difluoro)silane, chloro(trifluoro)silane, bromo(trifluoro)silane, bromo(dichloro)fluorosilane, dibromo(chloro)(fluoro)silane and the like and combinations of these. In embodiments, the silicon halide is silicon tetrachloride ($SiCl_4$).

In some embodiments, the silicon halide can bind to, or interact or react with alcohol (ROH) groups associated to the solid support. For example, the silicon halide may bind to, or interact or react with, alcohol (ROH) groups to form silicates. In embodiments, the binding, interaction, or reaction of a silicon halide with alcohol (ROH) groups can help to remove such alcohol groups from surfaces of the solid support structure. Correspondingly, in embodiments, the removal of alcohol groups from the surfaces of the solid support structure can help to enhance morphological characteristics of the solid support structure and/or increase the reactivity of the solid support (e.g., by providing or exposing more reactive sites for facilitating or effectuating catalytic activity).

The solid catalyst can be combined with a silicon halide and heated to a temperature of from about 60° C. to about 90° C. In embodiments, temperature can be about 85° C.

A titanium compound of the enhanced catalyst can then be introduced to the heated solid catalyst/silicon halide over a predetermined time period, for instance over a time period of approximately 3 hours to 5 hours (e.g., 3.5, 4, or 4.5 hours). The solid catalyst/silicon halide mixture can be stirred, for instance at a speed of approximately 350 rpm, 450 rpm, 800 rpm, or even up to 2,000 rpm. In embodiments, the solid catalyst/silicon halide mixture can be stirred at about 700 rpm. The titanium compound and the solid support can react in the presence of a silicon compound for between about 4 to about 6 hours. In embodiments, the solid catalyst/silicon halide and titanium compound may react for about 5 hours. The temperature at which addition of the titanium compound to the solid support occurs can be controlled. For instance, addition can occur at a temperature of between approximately 80° C. and 90° C. (e.g., approximately 85° C.).

In embodiments, during reaction, the titanium compound can be coupled to, coordinated on or associated with the solid support. The coordination or arrangement of the titanium compound relative to the solid support can be at least partially dependent upon the quantity, position, and/or spatial coordination of the internal electron donor on the magnesium compound of the support. Accordingly, in embodiments, the internal electron donor influences, affects, or determines at least one morphological property of the catalyst. In embodiments, the internal electron donor can facilitate an enhanced positioning, distribution, and/or coordination of the titanium compound on the support. In embodiments, the positioning of the titanium compound on or relative to the support can influence, affect, and/or determine the stereo-selectivity (or stereo-specificity) and/or catalytic activity of the catalyst.

In embodiments, the resulting enhanced catalyst can be purified by washing 220. Typically, the enhanced catalyst (or enhanced catalyst particles) is allowed to settle within the reactor before being removed (e.g., decanted) from the reactor. Accordingly, no stirring of contents of the reactor occurs immediately prior to washing 220. After the enhanced catalyst has settled within the reactor, the enhanced catalyst can be washed a number of times before being removed from the reactor. In various embodiments, washing can occur, for instance, using an aliphatic solvent such as hexane or heptane. The washing can take place at a temperature of, for example, between approximately 60° C. and 80° C. In embodiments, the washing temperature can be about 70° C. The enhanced catalyst can be washed any number of times. For example, the enhanced catalyst can be washed from about 2 to about 10 times. For example, the catalyst can be washed five, six, seven, or more times. In embodiments the enhanced catalyst can be washed 7 times. Other method or techniques known in the art for purification of a catalyst can also be used for purifying the enhanced catalyst.

In order to determine the number of washing times needed to obtain a purified catalyst, the amount of titanium in the wash rinsate can be detected. In embodiments, the amount of detected titanium in the wash rinsate can be about 0 mmol/L to about 25 mmol/L. In embodiments, the amount of titanium 1 in the wash rinsate can be less than about 10 mmol/L.

The enhanced catalyst can have a particle size in a range of from about 5 µm to about 8 µm. The ratio of titanium to magnesium in the support can be from about 1:10 to about 1:25. The particle size span of the enhanced catalyst can be from about 0.9 to about 1.1. The percentage of titanium in the enhanced catalyst can be from about 2.5 to about 3.0%. The percentage of magnesium in the enhanced catalyst can be from about 17.5% to about 20%. The average diameter of the enhanced catalyst can be from about 5.0 µm to about 7.0 µm.

Polymerization of Olefins with Enhanced Catalyst

Polymerization of olefins, such as α-olefins, may be performed using the enhanced catalyst of the present disclosure. Processes for polymerizing olefins (i.e. olefin polymerization processes) are provided according to various embodiments of the present disclosure. The olefin polymerization process can utilize the enhanced catalyst provided in accordance with embodiments of the present disclosure. While the polymerization process of the present disclosure is described with reference to olefin polymerization, any polymer, high molecular weight polymer, ultra high molecular weight polymer or blend of polymers can be polymerized in accordance with the present disclosure The olefin polymerization process can occur in a reactor, for example an autoclave reactor, equipped with a mechanical stirrer. Other reactors of different models and with alternative volumes or different configurations can also be used for the olefin polymerization process.

Figure 3:
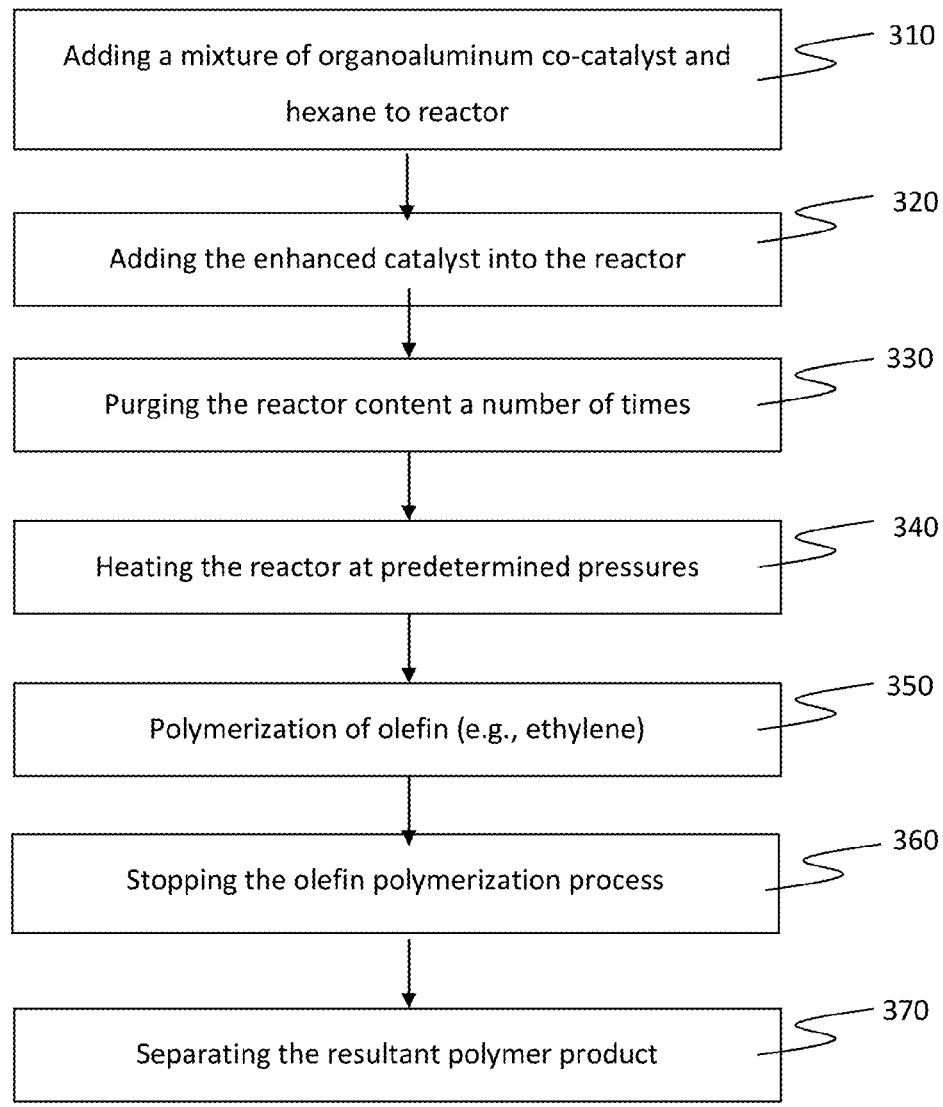
FIG. 3 shows a process 300 for polymerizing olefins according to an embodiment of the present disclosure.

FIG. 3 shows a process 300 for polymerizing olefins according to an embodiment of the present disclosure. In a first process portion 310, a mixture of an organoaluminum cocatalyst and a dried aliphatic solvent (e.g., hexane processed using nitrogen gas) can be added into the reactor.

In a second process portion 320, a predetermined amount or concentration of enhanced catalyst can be added into the reactor. In embodiments, the amount of enhanced catalyst can be based on the amount of titanium in the enhanced catalyst.

In a third process portion 330, the reactor content can be purged a number of times (e.g., three times) with 5 bar nitrogen gas. In a fourth process portion 340, the reactor can be heated to a temperature of approximately 70° C. and pressurized with about 1 bar ethylene gas, in embodiments, about 5.0 to about 7.0 bar ethylene, in embodiments, 6.2 bar ethylene can be maintained during polymerization. A constant total pressure of from about 7.0 bar to about 9.0 bar, in embodiments 8 bar can be used. Polymerization can take place at a temperature of between about 65° C. and about 85° C. In embodiments, the reaction can take place at about 70° C. The polymerization can occur for about 30 minutes to about 5 hours, in embodiments the polymerization can occur for about 2 hours.

In a fifth process portion 350, ethylene polymerization occurs at a constant pressure. The constant pressure can be achieved by ethylene flow control using an ethylene valve. In a sixth process portion 360, ethylene polymerization can be stopped by shutting off the ethylene valve. In embodiments, the ethylene polymerization can be stopped after approximately 2 hours. The reactor can be cooled to room temperature during the sixth process portion 360.

Finally, in a seventh process portion 370, the resultant polymer product can be separated from the other contents of the reactor and dried in an oven for approximately 2 hours.

Although the various time durations, pressures, and temperatures associated with the process 300 have been provided above, it will be understood that the aforementioned time durations, pressures, and/or temperatures can be varied as required, for instance depending upon desired speed of the olefin (e.g., ethylene) polymerization process, batch size, constituents, co-polymers, etc.

In embodiments, the catalytic activity of the enhanced catalyst in grams UHMWPE per mmol titanium (g/mmol) can be from about 22,000 g/mmol to about 50,000 g/mmol. In embodiments, the catalytic activity is greater than about 42,000 g/mmol.

The intrinsic viscosity, viscosity number, particle size, bulk density, particle diameter, and span value of the resulting UHMWPE can all be impacted by the enhanced catalyst. In embodiments, the intrinsic viscosity of the UHMWPE can be from about 1850 $cm^3/g$ to about 2300 $cm^3/g$. The viscosity number of the UHMWPE can be from about 2250 $cm^3/g$ to about 3100 $cm^3/g$. The average particle size of the UHMWPE can be from about 100 μm to about 170 μm. The average particle diameter of the UHMWPE can be from about 95 μm to about 165 μm. The viscosity average molecular weight (Mv) can be calculated as follows: $Mv=5.37\times10^4\times[\eta]^{1.49}$ where $\eta$=relative viscosity. The Mv of the UHMWPE of the present disclosure can be from about $4.0\times10^6$ g/mol to about $7.5\times10^6$ g/mol. The molecular weight of the UHMWPE can be determined using, for example ASTM D1601/D4020. The bulk density of the UHMWPE can be from about 0.35 g/cc to about 0.46 g/cc. Particle size can be determined using laser light scattering. The particle size span value of the UHMWPE can be from about 0.5 to about 0.6.

In addition, the use of the enhanced catalyst provided in various embodiments of the present disclosure can enable production of polyolefins (e.g., polyethylene) of low fine polymer content. For example, the use of the catalyst of particular embodiments enables production of polyolefins with a fine polymer content of less than 1% by volume. The catalysts of several embodiments have enhanced mechanical stability, thereby providing low fragmentation of polyolefins formed during the olefin polymerization process.

The present technology is further illustrated by the following examples, which should not be construed as limiting in any way.

EXAMPLES

Example 1

Step (i)

Preparation of Magnesium Complex Solution

All manipulation was performed in nitrogen atmosphere. About 30 g (0.315 mol) $MgCl_2$ was dispersed in 2-ethyl 1-hexanol (172.4 ml) (ROH/Mg=3.5). Next 300 ml toluene or ethyl benzene was charged to reactor. About 8.4 g (0.0945 mol) $AlCl_3$, 10.22 ml (0.126 mol) tetrahydrofurane, 9.8 ml (0.044 mol) tetraethyl orthosilicate, and 6.1 ml (0.0224 mol) tributyl phosphate were introduced into the reactor. The reactor was then heated to about 110° C. with stirring at 700 rpm under protection of nitrogen for 4 hours.

Step (ii)

Forming of Solid-State Support

Magnesium complex solution was cooled to 0° C. within 1 hour. Subsequently, 10 ml (0.069 mol) ethyl benzoate, 20 ml perfluorooctane (PFO) and 69.2 ml (0.63 mol) $TiCl_4$ were added. Re-crystallization of $MgCl_2$ was generated by stepwise heating of soluble magnesium compound to 100° C. with 15° C. incremental temperature rise and 30 min holding time at each step. Re-crystallization took place over about 3 hours. The reactor was then cooled down to 70° C. and the solid-state support was washed 3 times with 300 ml heptane.

Step (iii)

Treating of Solid-State Support with Titanium Compound and Silicon Halide

About 0.72 ml (0.0063 mol) $SiCl_4$ was added to the reactor. Then $TiCl_4$ was slowly fed into the reactor at temperature of 85° C. and stirred at 700 rpm over 5 hours. The agitator was switched off to settle the catalyst particles. The catalyst was washed seven times with 400 ml heptane at 70° C. Ti content in the rinsate was detected and was controlled to less than 10 mmol/L.

Example 2

The catalyst was prepared in accordance with Example 1, with the exception that 40 ml of perfluorooctane (PFO) was added into the reactor in the step of forming the solid-state support.

The characteristics and properties of the support and the enhanced catalyst of example two (e.g., composite element content) are shown in Table 1 below.

Example 3

Figure 5:
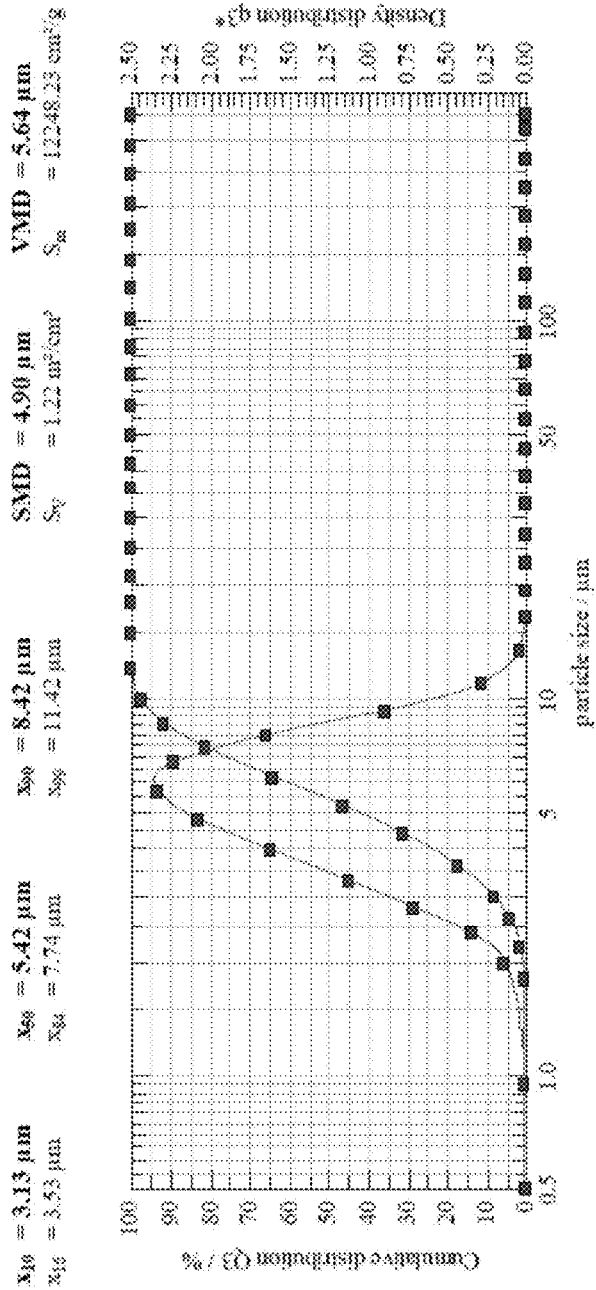
FIG. 5 depicts the results of the particle size and particle size span for the $MgCl_2$ support of Example 3.

In Example 3, the catalyst was prepared in accordance with Example 1, with the exception that 100 ml of perfluorooctane (PFO) was added into the reactor in the step of forming the solid-state support. FIG. 5 depicts the results of the particle size and particle size distribution for the $MgCl_2$ support of Example 3.

The characteristics and properties of the support and the enhanced catalyst of Example 3 (e.g., composite element content) are shown in Table 1 below.

Example 4

In Example 4, the catalyst was prepared in accordance with Example 1, with the exception that 120 ml of perfluorooctane (PFO) was added into the reactor in the step of forming the solid-state support.

The characteristics and properties of the support and the enhanced catalyst of Example 4 (e.g., composite element content) are shown in Table 1 below.

Comparative Example

Figure 4:
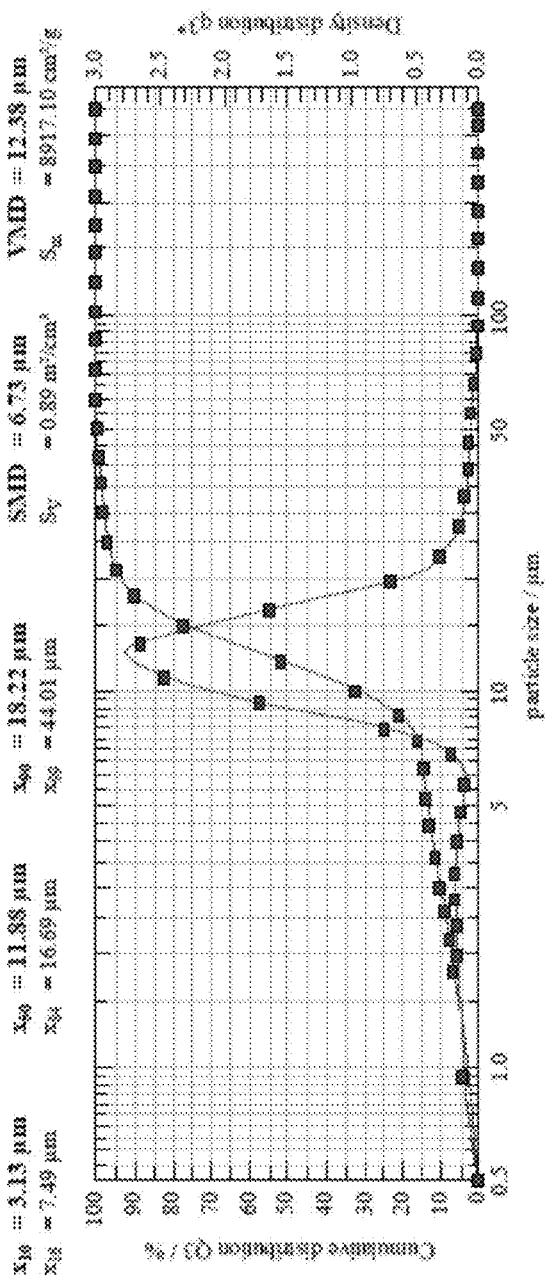
FIG. 4 depicts the particle size and particle size span of the Comparative Example catalyst.

The catalyst was prepared as in Example 1 above, except perfluorooctane was not added in the step (ii) of forming solid-state support. FIG. 4 depicts the particle size and distribution of the Comparative Example catalyst. The element content and particle properties of the catalyst are shown in Table 1.

Polymerization of Olefin (Ethylene)

Each of the Example 1-4 catalysts and comparative example catalyst was used in preparation of a UHMWPE as described herein below.

Polymerization of an olefin, more specifically UHMWPE, was carried out in a 2.0-liter autoclave reactor equipped with a mechanical stirrer.

Triethylaluminum was added to 1,000 ml dried hexane and then was transferred into the reactor. The amount of triethylaluminum was determined such that the molar ratio of Al/Ti in the reactor was approximately 88.

About 0.01 mmol catalyst suspension based on titanium was introduced into the reactor. Subsequently, the reactor content was purged 3 times with 5 bars of nitrogen gas. The reactor was then heated to 70° C. and pressurized with ethylene gas to constant total pressure of 8 bar over duration of 2 hours.

The pressure was kept constant during the polymerization of ethylene using a flow rate control. The polymerization reaction was stopped after 2 hours by shutting off a valve (e.g., ethylene valve) of the reactor and cooling to the reactor to room temperature. The resulting polymer suspension (i.e., polyethylene suspension) was separated and pre-dried by air exposure at ambient temperature and dried at 80° C. in a drying oven for 2 hours.

The results of the polymerization process, more specifically the catalytic activity together with the fine particle content and bulk density of the produced polymer produced using the catalyst of the Examples 1 to 4 and Comparative Example, are summarized and provided in Table 2 below. The catalytic activity was calculated as the weight ratio of the polymers produced (in grams or g) per amount (i.e., mmol) of the catalyst, more specifically Ti content of the catalyst, used (i.e., polyethylene g/mmol.Ti). The average particle size (APS) of the enhanced catalyst, and the polymer was determined by particle analyzer using laser (Sympatec). The particle size distribution was calculated by (d90−d10)/d50, wherein d10, d50, d90 respectively means the size of the particles by each percentage (i.e., 10, 50, and 90) and d50 being defined as the median size.

Figure 6:
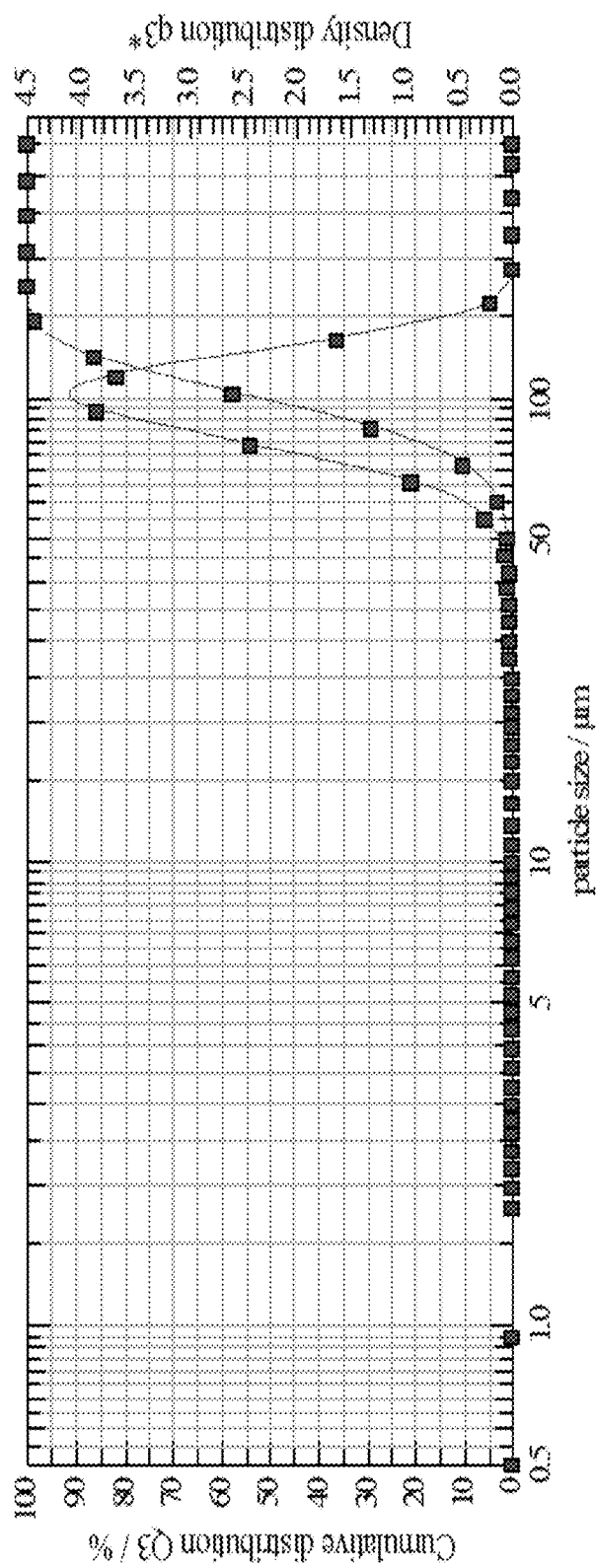
FIG. 6 depicts the particle size span of UHMWPE powder produced with the Example 4 catalyst.
Figure 7:
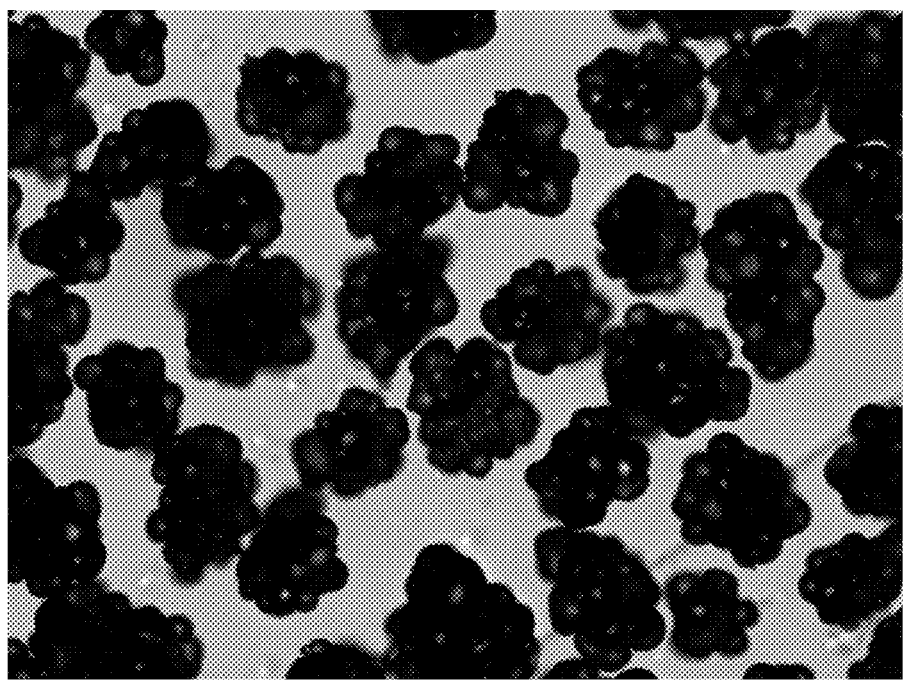
FIG. 7 is a microscope photograph of the UHMWPE powder produced using the Example 4 catalyst (magnification×100); and, FIG. 8 is a microscope photograph of the UHMWPE powder produced using the Example 5 catalyst (magnification×100).
Figure 8:
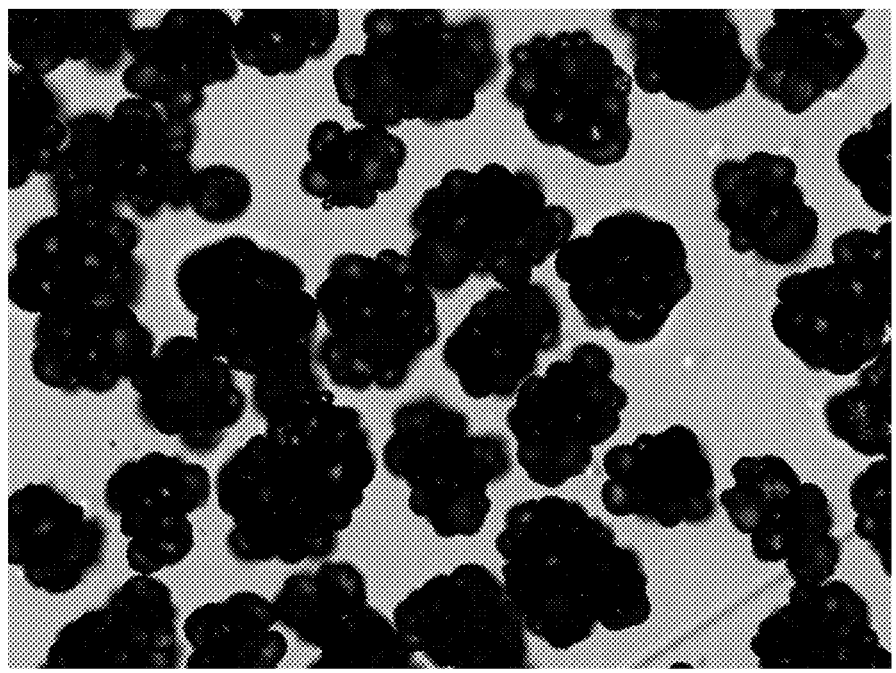

FIG. 6 depicts the particle size distribution of UHMWPE powder produced with the Example 3 catalyst. FIG. 7 is a microscope photograph of the UHMWPE powder produced using the Example 3 catalyst (magnification×100). FIG. 8 is a microscope photograph of the UHMWPE powder produced using the Example 5 catalyst (magnification×100).

TABLE 1

Characteristics and Properties of the Catalysts of Comparative Example and Examples 1-4

| Property | Unit | Catalyst | | | | |
| --- | --- | --- | --- | --- | --- | --- |
| | | Example 1 | Example 2 | Example 3 | Example 4 | Comparative Example |
| PFO | ml | 20 | 40 | 100 | 120 | — |
| APS of MgCl2 Support | VDM, μm | 7.4 | 7.2 | 6.3 | 6.3 | 8.9 |
| | d50 | 7.0 | 6.9 | 6.0 | 6.0 | 8.3 |
| Span | — | 0.94 | 1.0 | 0.95 | 0.97 | 1.27 |
| APS of Catalyst | VDM, μm | 7.6 | 7.4 | 5.6 | 7.3 | 12.4 |
| | d50 | 7.0 | 7.0 | 5.4 | 6.9 | 11.9 |
| Span | — | 0.9 | 1.1 | 1.0 | 0.9 | 1.3 |
| Ti content | wt. % | 2.6 | 2.9 | 2.6 | 3.0 | 2.0 |
| Mg content | wt. % | 18.4 | 18.8 | 19.6 | 17.9 | 24 |
| Al content | wt. % | 0.4 | 0.4 | 0.3 | 0.3 | 0.3 |
| Si content | wt. % | 0.6 | 1.0 | 0.9 | 0.8 | 1.0 |
| EB content | wt. % | 9.5 | 9.0 | 8.6 | 8.7 | 9.4 |

TABLE 2

Catalytic Activity and Produced Polymer Properties Associated With Catalysts of the Comparative Example and Examples 1-5

| Property | Unit | Catalyst | | | | |
| --- | --- | --- | --- | --- | --- | --- |
| | | Example 1 | Example 2 | Example 3 | Example 4 | Comparative Example |
| Catalytic Activity | g.PE/mmol.Ti | 21,500 | 32,000 | 42,000 | 48,000 | 41,000 |
| | g.PE/g.cat | 11,672 | 19,370 | 22,801 | 30,056 | 17,119 |
| UHMWPE | | | | | | |
| IV | cm³/g | 1,866 | 2,010 | 2,753 | 2,016 | 2,457 |
| VN | cm³/g | 2,296 | 2,212 | 3,177 | 2,498 | 3,123 |
| Mv | ×10⁶, g/mol | 4.2 | 4.7 | 7.5 | 4.7 | 6.3 |
| VDM | μm | 163 | 129 | 99 | 170 | 199 |
| d50 | μm | 159 | 124 | 97 | 162 | 205 |
| Span | — | 0.55 | 0.57 | 0.59 | 0.56 | 1.23 |
| BD | g/cc | 0.42 | 0.44 | 0.46 | 0.38 | 0.36 |

As shown in Table 2 and described above, a fluorinated organic compound was not added to the solid support of the catalyst of the Comparative Example. Use of fluorinated organics such as perfluorooctane can facilitate or effectuate production of a solid-state support of significant, unexpected, and/or surprisingly decreased average particle size and particle size span. Particularly, perfluorooctane can facilitate or effectuate production of an enhanced catalyst of significant, unexpected, and/or surprisingly decreased averaged particle size and particle size span. As a maximum of only about 17% PFO, based on the total solution size, was added to the solution, formation of an emulsion was not required to achieve these results. Thus, the amount of PFO required to effectuate such results may be minimal.

Use of the disclosed catalyst in polymerization of ethylene yields UHMWPE with a particle size below 200 μm. Advantageously, UHMWPE powder formed by using the disclosed catalyst also has a very narrow size distribution, in the range of about 0.55 to about 0.59 and bulk density of about 0.38 to about 0.46 g/cm³.

While features, functions, processes, process portions, advantages, and alternatives associated with certain embodiments have been described within the context of those embodiments, other embodiments may also exhibit such advantages, and not all embodiments need necessarily exhibit such advantages to fall within the scope of the disclosure. It will be appreciated that several of the above-disclosed features, functions, processes, process portions, advantages, and alternatives thereof, may be desirably combined into other different methods, processes, systems, or applications. The above-disclosed features, functions, processes, process portions, or alternatives thereof, as well as various presently unforeseen or unanticipated alternatives, modifications, variations or improvements thereto that may be subsequently made by one of ordinary skill in the art, are encompassed by the following claims.

The invention claimed is:

1. A process for preparing an enhanced catalyst for use in polymerization of an olefin comprising:
   preparing a solid support by:
      forming a magnesium complex solution, wherein said forming a magnesium complex solution comprises dissolving a magnesium compound in a solvent mixture in the presence of a group 13 metal halide;

chlorinating the magnesium complex solution with a chlorinating agent, wherein said chlorinating agent comprises one or more transition metal chlorides in the presence of an internal electron donor and a fluorinated organic compound to form a chlorinated magnesium complex solution; and recrystallizing the chlorinated magnesium complex solution by way of a stepwise recrystallization process that includes multiple heating steps performed at different temperatures to form a solid (magnesium chloride)•(electron donor) support, wherein said stepwise recrystallization process comprises a plurality of incremental heating steps of the chlorinated magnesium complex solution to about 115° C. over about 3 hours;

contacting the solid (magnesium chloride)•(electron donor) support with a titanium compound in the presence of a silicon halide; and precipitating the enhanced catalyst for use in polymerization of an olefin.

2. The process of claim 1, further comprising purifying the enhanced catalyst.

3. The process of claim 2, wherein the purifying is washing to remove unbound titanium.

4. The process of claim 1, wherein said contacting the solid support with the titanium compound occurs over a time period of about 3 to about 5 hours.

5. The process of claim 1, wherein said olefin is α-olefins.

6. The process of claim 1, wherein said enhanced catalyst has a particle size in a range of from about 5 μm to about 8 μm.

7. The process of claim 1, wherein said enhanced catalyst has a particle size span of from about 0.9 to about 1.1.

8. A process for preparing a solid support used in polymerization of an olefin comprising:

forming a magnesium complex solution, wherein said forming a magnesium complex solution comprises dissolving a magnesium compound in a solvent mixture in the presence of a group 13 metal halide;

chlorinating the magnesium complex solution with a chlorinating agent, wherein said chlorinating agent comprises one or more transition metal chlorides in the presence of an internal electron donor and a fluorinated organic compound to form a chlorinated magnesium complex solution; and recrystallizing the chlorinated magnesium complex solution by way of a stepwise recrystallization process that includes multiple heating steps performed at different temperatures to form a solid (magnesium chloride)•(electron donor) support, wherein said stepwise recrystallization process comprises a plurality of incremental heating steps of the chlorinated magnesium complex solution to about 115° C. over about 3 hours.

9. The process of claim 8, wherein said solvent mixture comprises one or more of an alcohol, an ether, a phosphorous compound, a hydrocarbon, and a silicon compound.

10. The process of claim 8, wherein the volume of said fluorinated organic compound is equal to or less than the total volume of the magnesium complex solution, chlorinating agent, and internal electron donor combined.

11. The process of claim 10, wherein the volume of the fluorinated organic compound is less than about 20% of the total volume of the magnesium complex solution, chlorinating agent, and internal electron donor combined.

12. The process of claim 8, wherein said plurality of incremental heating steps includes temperatures between 25° C. to 115° C. and a holding time at each of the plurality of incremental heating steps ranging from 15 to 60 minutes.

13. The process of claim 8, further comprising washing said solid (magnesium chloride)•(electron donor) support with at least one aliphatic solvent.

14. The process of claim 8, wherein said solid (magnesium chloride)•(electron donor) support has an average particle size of from about 6 μm to about 7.5 μm.

15. The process of claim 8, wherein said solid (magnesium chloride)•(electron donor) support has a particle size span value of about 0.9 to about 1.0.

16. A method for preparing an ultra high molecular weight polyethylene comprising:

providing an enhanced catalyst obtained by:
providing a solid support obtained by:
forming a magnesium complex solution, wherein said forming a magnesium complex solution comprises dissolving a magnesium compound in a solvent mixture in the presence of a group 13 metal halide;

chlorinating the magnesium complex solution with a chlorinating agent, wherein said chlorinating agent comprises one or more transition metal chlorides in the presence of an internal electron donor and a fluorinated organic compound to form a chlorinated magnesium complex solution; and recrystallizing the chlorinated magnesium complex solution by way of a stepwise recrystallization process that includes multiple heating steps performed at different temperatures to form a solid (magnesium chloride)•(electron donor) support, wherein said stepwise recrystallization process comprises a plurality of incremental heating steps of the chlorinated magnesium complex solution to about 115° C. over about 3 hours;

contacting the solid (magnesium chloride)•(electron donor) support with a titanium compound in the presence of a silicon halide; and precipitating the enhanced catalyst for use in polymerization of an olefin; and polymerizing ethylene monomers under pressure in the presence of an organoaluminum compound and the enhanced catalyst.

17. The method of claim 16, wherein said ultra high molecular weight polyethylene has a bulk density of from about 0.35 to about 0.46 g/cm$^3$.

18. The method of claim 16, wherein said ultra high molecular weight polyethylene has a particle size span value of about 0.5 to about 0.6.

19. A solid support produced by way of the process of claim 8.

* * * * *